United States Patent [19]

Grossman

[11] Patent Number: 4,495,988
[45] Date of Patent: Jan. 29, 1985

[54] CONTROLLED HEAT EXCHANGER SYSTEM

[75] Inventor: Arthur Grossman, Framingham, Mass.

[73] Assignee: The Charles Stark Draper Laboratory, Inc., Cambridge, Mass.

[21] Appl. No.: 366,931

[22] Filed: Apr. 9, 1982

[51] Int. Cl.³ .............................................. F28F 27/00
[52] U.S. Cl. ........................................ 165/96; 62/315;
62/514 R; 165/104.26; 165/104.27; 165/DIG. 14
[58] Field of Search ................... 165/104.27, DIG. 14,
165/104.26, 96 HP; 62/315, 514 R

[56] References Cited

U.S. PATENT DOCUMENTS

| | | | |
|---|---|---|---|
| Re. 30,077 | 8/1979 | Kun et al. | 165/DIG. 14 |
| 2,908,455 | 10/1959 | Hoadley | 62/315 |
| 3,049,795 | 8/1962 | Valyi | 428/550 |
| 3,161,478 | 12/1964 | Chessin | 428/613 |
| 3,170,512 | 2/1965 | Smith | 165/110 |
| 3,289,756 | 12/1966 | Jaeger | 165/155 |
| 3,302,704 | 2/1967 | Valyi | 165/170 |
| 3,384,154 | 5/1968 | Milton | 165/1 |
| 3,457,990 | 7/1969 | Theophilos et al. | 165/133 |
| 3,502,138 | 3/1970 | Shlosinger | 165/104.26 |
| 3,525,670 | 8/1970 | Brown | 165/104.26 |
| 3,696,861 | 10/1972 | Webb | 165/133 |
| 3,968,787 | 7/1976 | Basiulis | 165/104.26 |
| 4,064,914 | 12/1977 | Grant | 138/142 |
| 4,170,262 | 10/1979 | Marcus et al. | 165/104.26 |
| 4,196,504 | 4/1980 | Eastman | 165/104.26 |
| 4,232,056 | 11/1980 | Grant et al. | 427/37 |

FOREIGN PATENT DOCUMENTS 0916955  4/1982  U.S.S.R. .................. 165/104.26

OTHER PUBLICATIONS

Niinikoski, T. O., "Construction of Sintered Copper Heat Exchangers", *Cryogenics*, Jun. 1971, pp. 232–233.
Steyert, W. A. and Stone, N. J., "An Ultra-compact Low-cost Heat Exchanger", *Cryogenics*, 1978.
Zuber, N., "Recent Trends in Boiling Heat Transfer Research", *Applied Mechanics Reviews*, vol. 17, No. 9, Sep. 1964, pp. 663–672.

Primary Examiner—Sheldon J. Richter
Attorney, Agent, or Firm—Kenway & Jenney

[57] ABSTRACT

A system for transferring heat from a first (inner) surface through a second (outer) surface. The system includes at least two adjacent porous and thermally conductive layers between the first surface and the second surface. The innermost layer is characterized by a relatively high porosity and the outermost layer is characterized by a relatively low porosity. The innermost layer houses a fluid coolant. The pores of the innermost and outermost layers are coupled, permitting coolant flow therebetween. A vapor chamber is positioned between the outer surface and an outer member. A controller is adapted to control the vapor pressure in the vapor chamber whereby the coolant has a liquid vapor phase transition in the outermost layer.

1 Claim, 4 Drawing Figures

CONTROLLED HEAT EXCHANGER SYSTEM

BACKGROUND OF THE INVENTION

The present invention is in the field of heat exchangers, and more particularly in the field of evaporative, porous metal heat exchangers.

Conventional evaporative heat exchangers are generally of tubular construction and include discrete expansion valves. The coolant is typically contained in a separate stand-by reservoir and requires an active means to pump the coolant to the expansion valves. With this construction, such heat exchangers are characterized generally by relatively poor thermal "footprints", i.e. they do not provide a substantially uniform temperature outer surface. Furthermore, such heat exchangers require separate stand-by coolant reservoirs and an active means for pumping coolant to the expansion valves.

More recently, the heat exchangers have been developed where a coolant fluid is passed at relatively low flow velocity through a relatively large contact surface area, small fluid passages. Generally, the heat exchange matrix is in the form of a fine metal screen, or sintered metal powder, for example. These structures provide a desired porosity matrix which is characterized by a relatively high thermal conductivity. The resultant structures provide a relatively low flow impedance. However, these heat exchangers too are characterized by relatively poor thermal footprints.

It is an object of the present invention to provide an improved evaporative, porous metal heat exchanger.

SUMMARY OF THE INVENTION

Briefly, the present invention is directed to a system for transferring heat from a first surface through a second surface where the second surface is characterized by a substantially uniform envelope. The system includes an inner porous layer adjacent to the first surface. That inner layer is characterized by relatively high porosity and thermal conductivity. Moreover, that layer is adapted to house coolant.

An outer porous layer is positioned between the inner layer and an outer member. The preferred surface of the outer layer defines the second surface, which is characterized by a uniform thermal envelope. A vapor chamber is positioned between the second surface and the outer member. The outer layer is characterized by a relatively low porosity and relatively high thermal conductivity. The outer layer is thermally coupled to the inner layer and the pores of the outer layer are coupled to the pores of the inner layer, thereby permitting coolant flow therebetween.

In operation, a selectively operable controller adjusts the vapor pressure in the vapor chamber so that the coolant housed within the porous inner layer has a liquid-vapor phase transition within the outer layer.

Thus, the heat exchanger of the present invention is a sandwich construction, with a high porosity inner layer providing a coolant reservoir. A conductive heat transfer path is provided to an evaporator. The outer low porosity layer functions as the evaporator, providing a high pressure loss coolant flow path within its structure. In this sandwich, the liquid and vapor state of the coolant are controlled to co-exist over a range of pressures by the control of the back pressure in the vapor chamber. The back pressure, as controlled by the controller, governs the evaporation rate of the coolant. Lowering this pressure increases the evaporation rate of coolant in the low porosity layer and increases the heat flow from the surface-to-be-cooled. Thus, the temperature of the surface-to-be-cooled is controlled by modulating the vapor pressure chamber.

In one form of the invention, the coolant flows in a closed loop, wherein vaporized coolant is collected from the coolant chamber exit and routed to an external system where it is condensed, pressurized, and pumped back to the internal reservoir within the inner layer. In another operational mode, the coolant vapor extracted from the vapor chamber is exhausted to the environment, thereby depleting the coolant.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
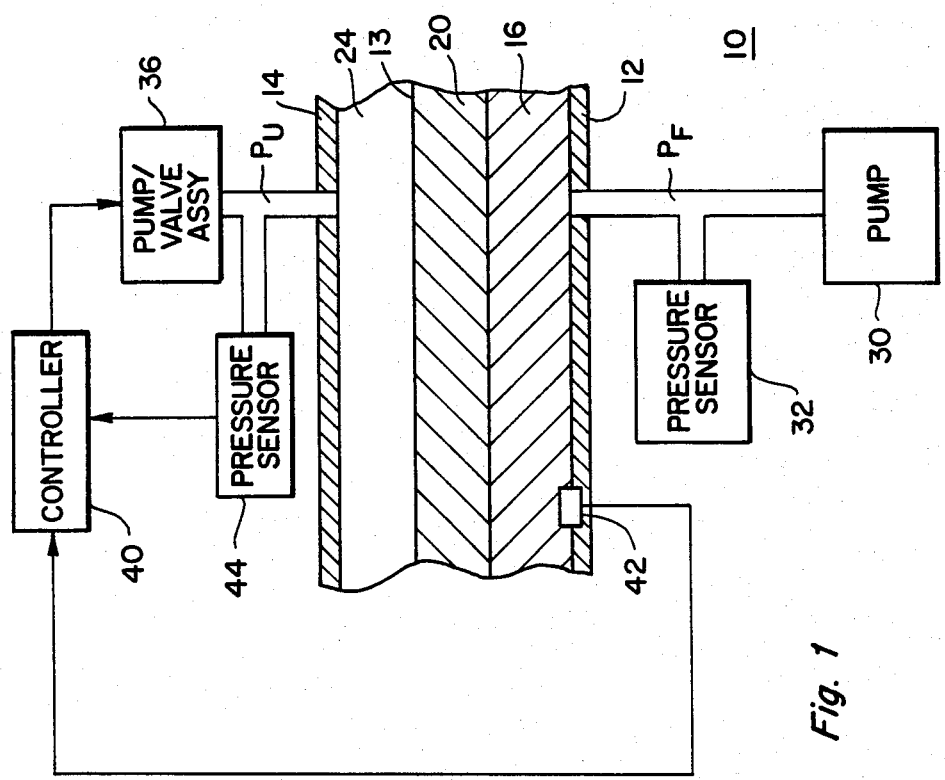
FIG. 1 shows in section a portion of a heat exchanger system according to the present invention.

FIG. 1 shows in section a portion of a system 10 for transferring heat from a first (or inner) surface 12 through a second (or outer) surface 13, where the outer surface 13 is characterized by a substantially uniform thermal envelope. The system 10 includes a multilayer porous structure thermally coupled to the surface 12. In the embodiment of FIG. 1, the multilayer structure incorporates two layers 16 and 20. The peripheral surface of the outer layer 20 functions as the second surface 13 in this embodiment. An outer member 14 is positioned in order to establish a vapor chamber 24 between it and the second surface 13.

The inner layer 16 is characterized by a relatively high porosity and thermal conductivity. The second or outer layer 20 is characterized by relatively low porosity and relatively high thermal conductivity. The two layers 16 and 20 are thermally coupled to each other, and the pores of the outer layer are coupled to the pores of the inner layer. In the preferred form, the outer layer 20 is made from sintered copper. By way of example, this material may be 100 FX Series, manufactured by Astro Associates, Inc., Cincinnati, Ohio.

The inner layer 16 is preferably made from an element selected from the group consisting of spherical particle metal powders, foam metals, felt metals, and ceramic materials. By way of example, this material may be an open cell, reticulated copper foam, such as Type 210-10 manufactured by Astro Met Associates, Inc. In other embodiments, additional intermediate layers with successively decreasing porosity (or graded porosity) may be positioned between the layers 16 and 20. In yet other embodiments, a relatively high porosity layer may be positioned between the outer layer 20 and the second surface 13.

As shown in FIG. 1, a pump 30 and associated pressure sensor 32 are coupled to the inner porous layer 16.

Elements 30 and 32 are adapted to provide a liquid phase coolant in the layer 16. A pump and valve assembly 36 is coupled to the interior of the vapor chamber 24. A controller 40 is coupled to the vapor chamber by way of a temperature sensor 42 and a pressure sensor 44. The controller 40 is adapted to control the vapor pressure in the vapor chamber 24 so that the coolant between elements 12 and 14 has a liquid-vapor phase transition within the outer layer 20. In the present embodiment, the pump 30 and pressure sensor 32 is adapted to provide a continuous flow of coolant into the layer 16. In alternate embodiments, the system may be initially charged with a coolant in layer 16, without means for replenishing that supply. In the latter form, the pump and valve assembly 36 controls the vapor pressure chamber to maintain the liquid-vapor phase transition within the outer layer 20, and thus providing effective heat exchange operation, until the supply of coolant in layers 16 and 20 has been exhausted.

In operation, the relatively high porosity inner layer 20 provides a low resistance liquid flow path within the structure. This layer 16 effectively establishes a coolant reservoir adjacent to the surface-to-be-cooled 12. The outer layer 20 is characterized by relatively low porosity, and provides a continuous surface with a restrictive liquid/vapor flow path for coolant within its structure. With this configuration, the liquid and vapor state of the coolant can coexist at different pressures in the functioning system. By controlling the vapor pressure on the far side of the outer layer 20, i.e. in the vapor chamber 24, the temperature of the surface 12 is controlled by utilizing the unique equilibrium state of the coolant's vapor pressure-temperature relationship. Heat is transferred from the heat source (surface 12) through the porous metal structure (layers 16 and 20) by a combination of conduction, mass transport and vapor/condensation cells within the structure. The rate of evaporation depends on the heat flow and the rate at which vapor can leave the vapor chamber outside the porous metal shell.

In some forms of the invention, the coolant extracted from the vapor chamber 24 may be condensed and reinjected into the high porosity inner layer 16 to extend the operational utility of the heat exchanger. As a consequence of this operation, the thermal footprint associated with the second (or outer) surface 13 is substantially uniform. This is in part established by the transverse heat flow within the structure formed by layers 16 and 20.

In another form of the invention, the system may be configured for adaptively initiating operation. For example, the pores of the outer layer may initially be filled with a relatively low melting point material (rendering layer 20 initially non-porous). When the surface 12 gets sufficiently hot, the pore-filling material melts and opens up the pores of layer 20 and the above-described heat transfer begins.

Figure 2:
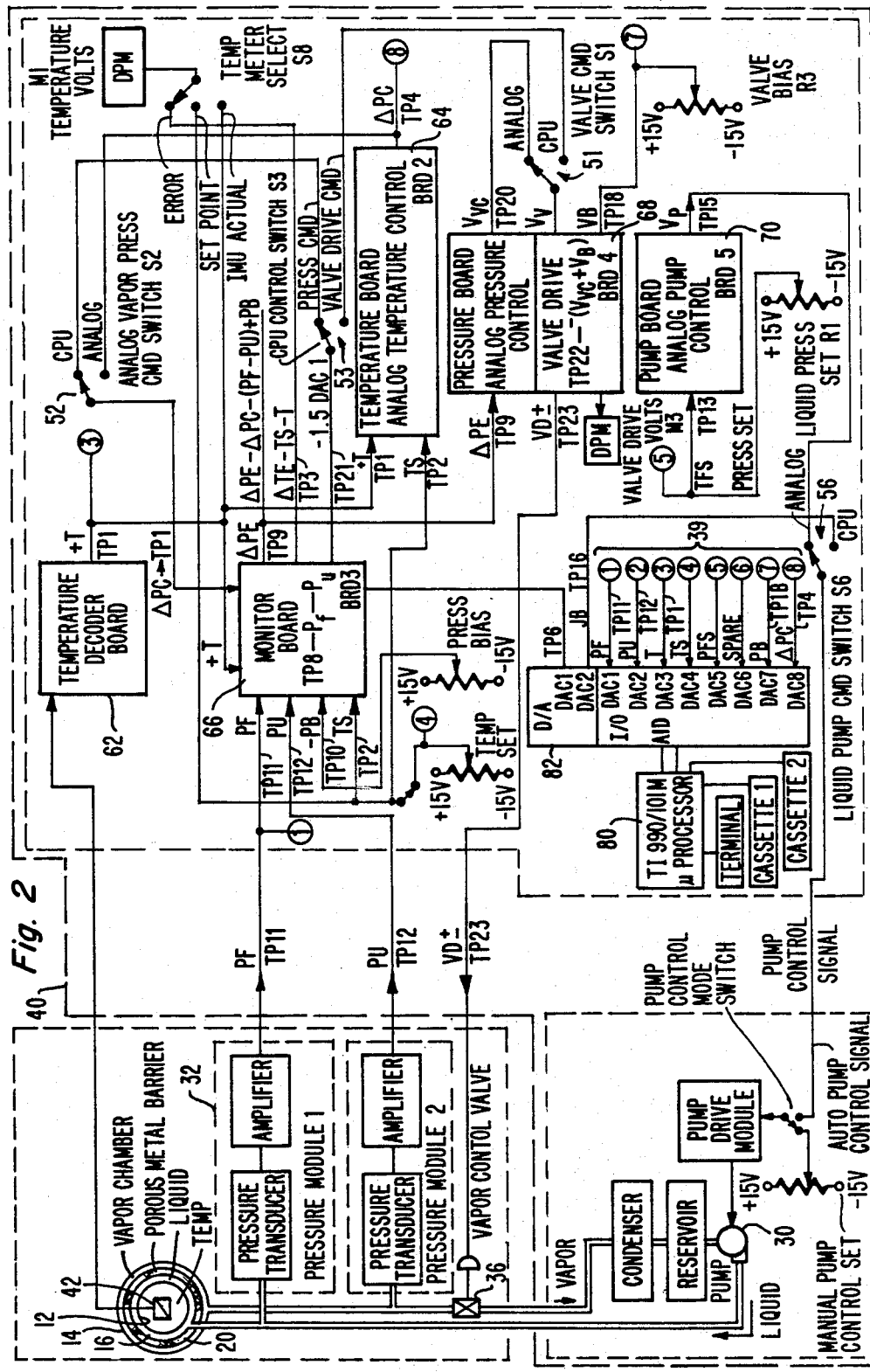
FIG. 2 shows in detailed block diagram form, an embodiment of the present invention.

FIG. 2 shows, detailed exemplary embodiment of a heat exchanger system in accordance with the present invention. The system of FIG. 2 is adapted for cooling a spherical body within a heat exchanger configured according to the present invention. In FIG. 2, elements corresponding to elements in the embodiment of FIG. 1 are denoted by identical reference designations.

Figure 3:
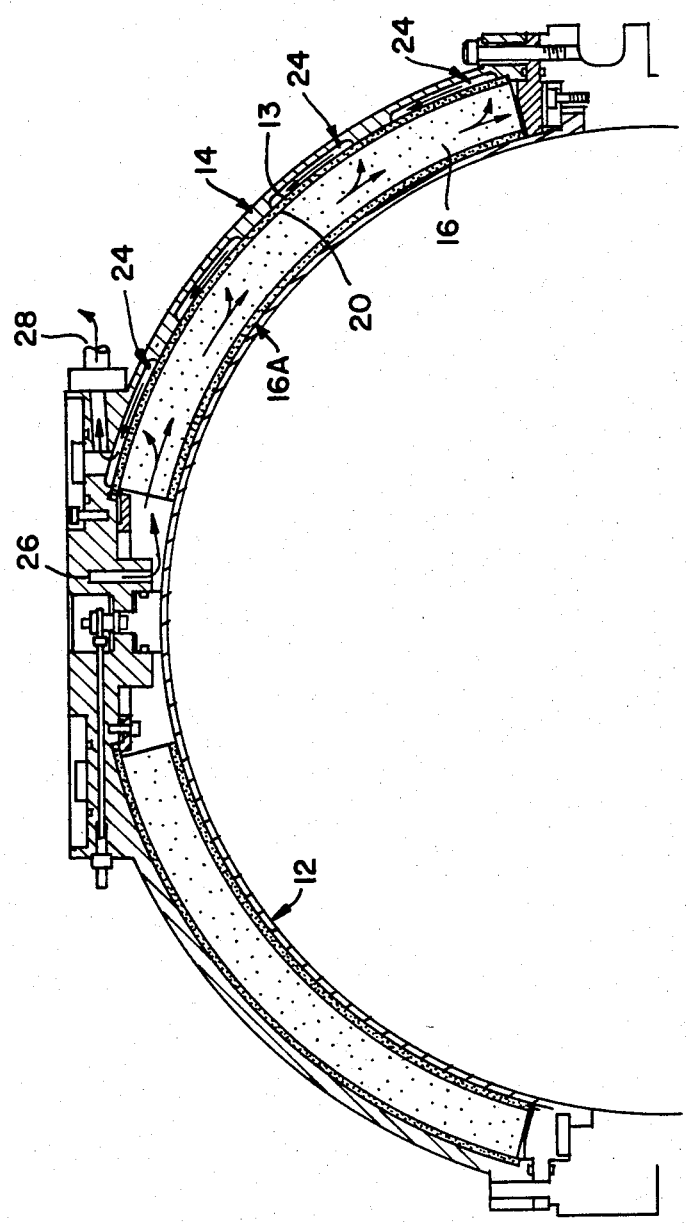
FIG. 3 shows in section a segment of a spherical heat exchanger.

FIG. 3 shows (in section) one segment of the hemispherical shell of one form of heat exchanger structure in accordance with this invention. The segment includes two separate different porosity layers of copper bonded together. The relatively thick inner layer 16 is a metal foam made of 11% dense copper, while the outer layer 20 is a metal foam made of 86% dense copper. On the innermost surface, of layer 16, i.e. adjacent to surface 12, there is radial and circumferential grooving to provide ducts for distributing coolant fluid within the inner portion of that layer. The outer member 14, or vapor shell, is a machined aluminum structure having lands cast into the spherical inner surface for the purpose of providing bonding seats for the copper foam segments. The outer layer 20 is epoxybonded to these seats. The innermost portion of the copper foam is layer 16A crushed upon assembly in order to improve and control the thermal conductivity across the gap from the surface 12 to the heat exchanger. Alternatively, a crushable copper, such as Foam Metal CU 45, manufactured by Hogen Industries Inc. of Willoughby, Ohio, may bridge the gap between layer 16 and the surface-to-be-controlled 12. The arrows generally show the flow of coolant in the illustrated quadrant from the input port 26 to the output port 28.

In the present embodiment, the liquid supply pressure $P_F$ is controlled by a liquid supply pump 30. The temperature of the surface 12 is controlled by varying the amount of heat removed from the system by vaporization of a Freon R-114 cooling fluid, by control of the mass flow of vapor leaving the vapor chamber 24. The valve 36 restricts the vapor flow out of the vapor chamber 24 by means of an electronically controlled variable orifice. The liquid pressure $P_F$ and vapor chamber pressure $P_U$ are sensed by pressure transducers 32 and 44 located on the heat exchanger liquid inlet and at the vapor chamber outlet, respectively. The temperature of surface 12 is sensed by a thermistor 42.

Figure 4:
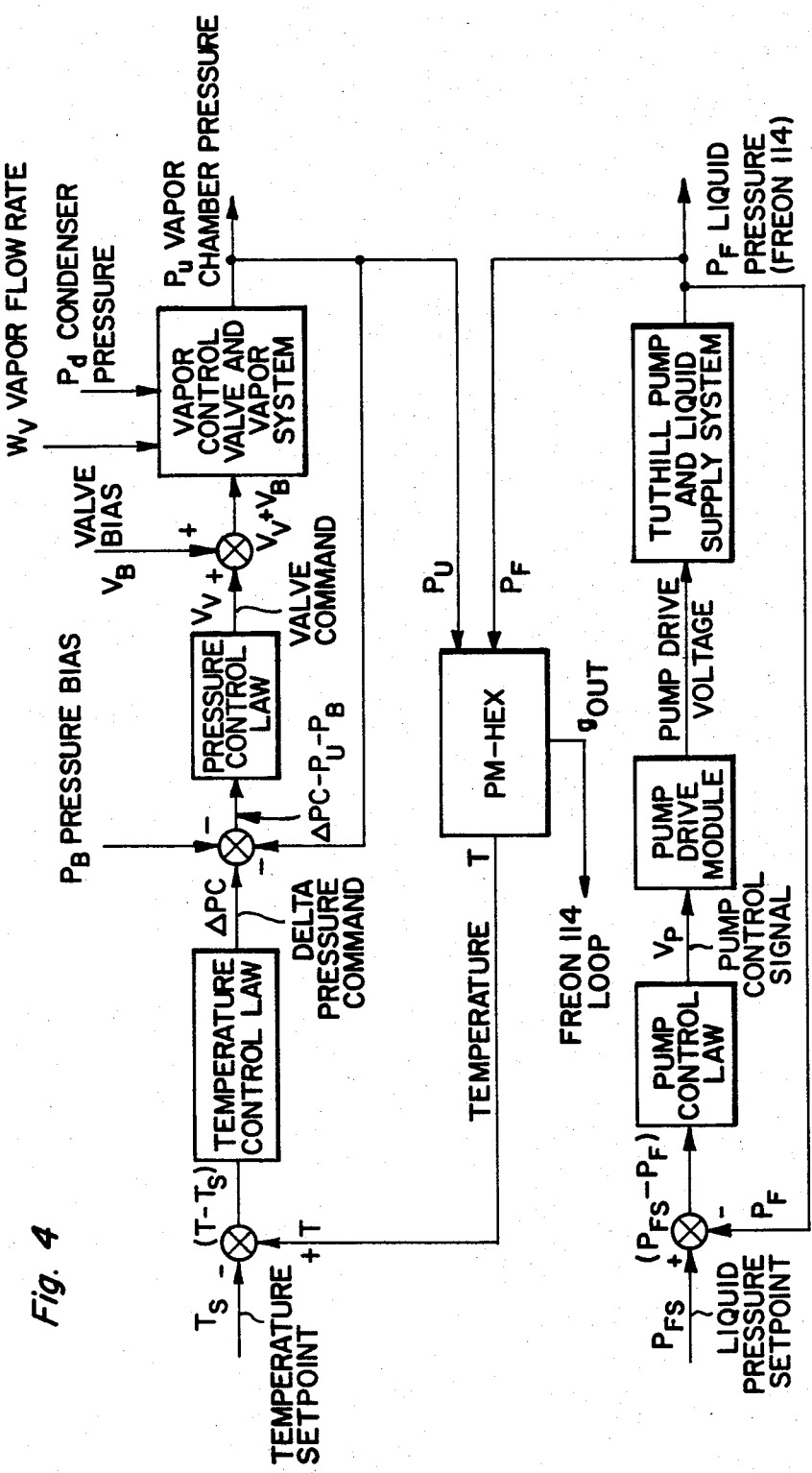
FIG. 4 shows a block diagram of the control system of the embodiments of FIG. 2.

FIG. 4 shows a block diagram of the control system for this embodiment. Three control loops are implemented: a liquid pressure loop which regulates the Freon 114 liquid supply pressure, a temperature control loop, which controls the surface 12 temperature by commanding a change in vapor chamber pressure and a minor control loop, which controls a Freon 114 vapor control valve.

The liquid pressure loop compares a liquid pressure set point, $P_{FS}$, to the actual liquid pressure, $P_F$, and generates a pump control signal to increase or decrease the speed of the liquid supply pump 30. This pump control signal is input to a pump drive electronics module which controls the pump motor. Pump speed is thus used to maintain liquid supply pressure at the set point.

The temperature control loop functions by controlling the pressure in vapor chamber 12. Liquid supply pressure is selected to cause that flow required to satisfy heat load requirements.

Vaporization of the coolant within or at the surface of the porous layer 20 occurs in accordance with conditions of temperature, pressure, and heat transfer to the fluid (Freon 114). Vapor chamber pressure determines the Freon 114 vaporization temperature at the surface of (or within) the porous layer 20, and thereby determines the driving temperature differential (across the porous metal) for heat transfer out of the surface 12. Therefore, control of vapor chamber pressure allows control of heat flow out, thus allowing control of surface 12 temperature. Accordingly, a temperature error is used to call for a pressure change, modifying heat flow out of the system, therefore controlling temperature.

The vapor pressure control loop, a minor loop in the temperature control system, nulls the quantity $$\Delta PC - P_U - P_b$$

where
 $\Delta PC$ = Change in pressure command from temperature loop
 $P_U$ = Vapor pressure
 $P_b$ = Pressure bias value
Pressure bias is normally set to operating point pressure ($P_U$).

The vapor chamber pressure, $P_U$, is varied by the vapor control valve 36, which is an electronically controlled variable flow orifice valve. The pressure control law produces a valve command which sets the valve flow area, in combination with an independently set valve bias voltage adjustment, $V_b$. The overall range of control is governed by the flow area limits of the valve and the downstream pressure.

In the preferred form, each pressure of transducer modules 32 and 44 includes a Type DHF pressure cell (0–50 psig), manufactured by BLH Electronics, and an associated amplifier circuit. The units are calibrated such that the overall output is scaled at 1 volt/psi, with a bias of 0 volts at 20 psia for vapor pressure transducer, and 0 volts at 30 psig for liquid modules.

The pump 30 is a Tuthill magnetic gear pump, Model 9175. The pump control responds to an external voltage input. The drive module contains a switch which can select either manual pump control, by means of a potentiometer on the drive module box, or automatic control in response to an external input. The vapor control valve 36 is a Bertea vapor control valve used to control vapor flow and pressure. The valve 36 contains an electronically controlled variable orifice, with the flow area decreasing as the voltge to the valve is increased.

The controller 40 includes five analog control circuits: temperature decoder 62, temperature control 64, monitor 66, pressure control 68, analog pump control 70, and a TI 990/101M microprocessor system 80 and an associated analog input/output network 82 and power supplies (not shown). The five analog circuits perform the following functions:

(1) Temperature Decoder 62 Converts an input temperature signal to an analog voltage, required for control.

(2) Temperature Control 64 Analog temperature control.

(3) Monitor 66 Creates the pressure error signal and temperature error signals required.

(4) Pressure Board 68 Contains the analog vapor pressure control circuit, the valve drive circuit, and a precision voltage generation circuit.

(5) Analog Pump Control 70 Analog liquid pressure control.

The CPU control switch 53 controls the output of the microprocessor DAC2. The computer controller 80 executes both the temperature (outer loop) control, which has a $\Delta P_C$ output command, and the vapor chamber pressure (minor loop) control, which has a valve drive command output. If both digital loops are run simultaneously, then the $\Delta P_C$ command from the temperature control loop is used internally as the input to the vapor pressure control loop, and the output from the computer (DAC2) is a valve command. In this case, the CPU control switch 53 is set on valve drive CMD. This case is commanded in the software by setting FLAG=0. If digital temperature control only is desired, along with the analog vapor pressure control minor loop, FLAG is set to a nonzero value in the software. The output to DAC2 is then a $\Delta P_C$ voltage command to be input to the analog vapor chamber pressure control board. In this case, the CPU control switch 53 is set in the PRESS CMD position.

The analog vapor pressure CMD switch 52 determines the source of the $\Delta PC$ command input to the analog vapor pressure control board: CPU, in which the command is derived from the microprocessor temperature control loop, or ANALOG, in which the $\Delta PC$ command is derived from the analog temperature control loop on the temperature control board.

The LIQUID PUMP CMD switch 56 determines the source of command input to the liquid pump; the analog liquid pressure control output in the ANALOG position, or the output from the digital liquid pressure loop in the CPU position.

The VALVE CMD switch 51 determines the source of the valve drive command. This drive command is summed with the $V_b$ value, set on the VALVE BIAS potentiometer, to yield the final overall value drive voltage. In the ANALOG position, the command is derived from the analog vapor pressure control loop. In the CPU position, the command is derived from the digital pressure control system.

The microprocessor-based digital control system 80 implements control functions with relatively long time constants and to provide the capability for additional control logic and modes of control. The system 80 includes a microprocessor having a Texas Instruments TM 990/302 software development board. This board provides a ROM based, operating system with a text editor, 2 pass assmbly, program loader, program debugger, and ROM programmer, all contained in 8 K of ROM memory. The system 80 incorporates a TI Silent 700 terminal as the I/O device, and two standard cassette records as program storage devices. A RAM expansion memory board, TM 990/206, is included for software development work, and a ROM memory board, TM 990/201, was included for operational use. An Analog Devices RTI-1243 analog I/O board 82 provides A/D and D/A capability.

In the operational configuration, the control program is stored in two TMS 2716 ROMS, contained in location $2000_{16}$–$2FFF_{16}$ on the 201 memory board. The 302 software development operating system is also present and used to initialize the control program. After power-up the operating system is obtained by pressing the RESET button, and performing a carriage return on the terminal, the 302 software development monitor is then entered. (The 302 software development system is fully described in the TI users manual). The control program is started by entering the .DP (Debug Program) mode. An initial workspace pointer (WP) of $1000_{16}$ is selected. Two program entry points are available; $2000_{16}$, which reinitializes all control constants and program running variables from ROM, or $2100_{16}$, which does not initialize anything. The program must be first run at location $2000_{16}$ to initialize the constants. The program may be interrupted and control returned to the monitor by pressing the RESET button, and performing a terminal carriage return. At this point, the .DP (Debug Program) mode may be entered again. Memory constants can now be changed by using the .IM (Inspect Memory) command at the desired program location. Control law gains may be changed in this manner. The program is started by initializing the Program Counter to $2100_{16}$, and issuing an .EX command.

The control program performs two major functions:
(1) Data logging on terminal
(2) Control of liquid pressure
(3) Control of either vapor chamber pressure and temperature simultaneously, or control of temperature only (in which case vapor chamber pressure control is done by the analog control board).

A program listing and RAM variable list for microprocessor 80 is contained in Appendices 1 and 2.

The program is interrupt driven with a main routine and two interrupt levels. The highest priority interrupt is the clock interrupt—typically run at 32 Hz. The eight A/D values are converted in this routine and summed such that eight converted, summed values of each A/D channel are passed out to the control program —which runs typically at 4 Hz. The A/D sums are performed in the vector ADCT. Summed A/D variables are as follows:

| Channel | Variable |
|---|---|
| 1 | $P_F$ |
| 2 | $P_U$ |
| 3 | T |
| 4 | $T_s$ |
| 5 | $P_{FS}$ |
| 6 | SPR |
| 7 | $P_b$ |
| 8 | DPc |

Since the A/D is 12 bits, with two's complement scaling for polarity, the summed eight values are always contained within the 16 bit word. Therefore, the overall scale factor in bits/volt for each channel is $$\frac{8*2048}{10\ v} = 1638.4 \ \frac{\text{bits}}{\text{volts}}$$

Every eight clock interrupts (for QCNT=8) the A/D sums are copied to the variable list and the control program run. The control program is run on Interrupt 6. This program is called by setting output bit P6 of the TM 990/101M board high, then low. This bit is wired to the input of INT6 on the same board. Thus, a hardware INT6 is generated and the interruptable control programs runs.

Time counters for each of the three control loops are kept. These counters are decremented and the routines run when the counter equals 0. Typically, the liquid pressure and temperature loops are run at 1 Hz, while vapor pressure loop runs at 4 Hz.

Control calculations are performed in the PID subroutine. This subroutine is called with the current error (calculated in control set up routines VCTL, PCTL, TCTL) in R0, and R9 containing the address pointer of a control data table. All references in P/D to control variables are then referenced as offsets to the data table base address. The data tables are RAM vectors of length 66 bytes: TDAT, PDAT, FDAT. The individual variable location within these tables are shown in the RAM variable list of Appendix 2.

The PID control subroutine contains three modes of operation—depending on the value of MODE. The modes are defined as follows:

| | |
|---|---|
| MODE < 0 | RESET |
| 0 ≦ MODE < MOD2 | STARTUP |
| MODE = MOD2 | RUN |

The value of MODE is initialized at 0, and increments once per control call, until MODE=MOD2, when it is fixed at that value. In the STARTUP mode proportional, integral, derivative control is performed with control error limit checks. If the control error is greater than CHI, or less than CLO, the output OUI is set to OTHI or OTLO, respectively, and the integrator, EI, is cleared. In the RUN Mode, entered after the startup period, an out-of-limit error causes a RESET mode. In a RESET, the value of MODE is initialized to −MOD1, and the output set to MOD0. This fixed output continues until MODE increments to 0, when STARTUP is entered. RESET mode may be bypassed by setting MOD1 equal to a negative value (whose absolute value is less than MOD2).

The PID terms are all computed, scaled, and limited before summing into the output OUT. Scaling of the proportional term is $$\frac{GP}{65535} *64 \ \frac{\text{volts out}}{\text{volts error}}$$

The output is limited to ±5 volts output. The integral term EI, is computed as follows:

$$EI = EI + \frac{GI}{65535} \cdot \frac{ERR}{32} \ \text{(volts)}$$

At a 1 Hz control rate, the integrator integrates at $$\frac{GI}{65535} \ \frac{8}{32} \ \frac{\text{volts/sec out}}{\text{volt error}}$$

The error rate, RATE, is computed by first computing the delta error between the current (unfiltered) error, located at E O in the error table, and some error at a previous time, located in the table. This delta error time is set by the variable ERRL. The number of control periods over which the delta error is computed is equal to ERRL/8. This delta error is now filtered by a 1st order digital filter to produce RATE. The rate term is equal to $$\frac{GD}{65535} *64 *RATE$$

For ERRL=8 (4 sec period to compute rate over) the rate terms scaled as follows:

$$\frac{GD}{65535} *256 \ \frac{\text{volts out}}{\text{volt/sec in.}}$$

Upon entry at $2000_{16}$ the RAM variables are initialized. The interrupts are setup and the clock interrupt started. The main routine now enters a data logging loop—initiated by the counter LTIM, which is decremented in the clock interrupt routine. At the time when LTIM=0, the eight A/D variables are output in scaled form. (psi or Degrees F). Also the following variables are output for each control law (1 line):
ERR
RATE
EI

MODE
OUT

The main program can be entered at 2100≠if RAM initialization is not desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX I

```
0010                    IDT    'HEX'
0020  0000        *
0030  0000        *     PM-HEX CONTROL PROGRAM:REV 1
0031  0000        *
0032  0000        *     COPY 1 ASSEMBLED 3/17/81
0033  0000        *
0040  0000        *
0050  0000        *     UNINITIALIZED RAM
0060  0000        *
0070  1000              AORG  >1000
0080  1000        WSP0  BSS   32         LOG WS
0090  1020        WSP1  BSS   32         CONTROL WS
0100  1040        WSP2  BSS   32         CLK INT WS
0110  1060        STK   BSS   32         LOG STK
0120  1080        STK0  BSS   32         CONTROL BACK STACK
0130  10A0        STK1  BSS   2          CONTROL STK PTR
0140  10A2        SR15  BSS   2          TEMP STORE FOR R15
0150  10A4        QTIM  BSS   2          BASE TIMER LOOP CTR
0160  10A6        FTIM  BSS   2          LIQ LOOP TIMER
0170  10A8        PTIM  BSS   2          VAPOR LOOP TIMER
0180  10AA        TTIM  BSS   2          TEMP LOOP TIMER
0190  10AC        LTIM  BSS   2          LOG LOOP TIMER
0200  10AE        LTAB  BSS   64         LOG DATA TABLE
0210  10EE        BUFF  BSS   2          OUTPUT BUFFER
0220  10F0        BUF2  BSS   4
0230  10F4        BUF6  BSS   4
0240  10F8        BF10  BSS   22
0250  110E        DTIM  BSS   2          DAY TIMER
0260  1110        HRS0  BSS   2
0270  1112        MIN0  BSS   2
0280  1114        SEC0  BSS   2
0290  1116        *
0300  1116        *     A/D VALUES,FILTERED
0310  1116        *
0320  1116        PF    BSS   2          A/D 1-LIQ PRESS
0330  1118        PV    BSS   2              2-VAPOR PRESS
0340  111A        T     BSS   2              3-IMU TEMP
0350  111C        TS    BSS   2              4-IMU TEMP SET
0360  111E        PFS   BSS   2              5-LIQ PRESS SET
0370  1120        VV    BSS   2              6-VALVE DRIVE VOLTS
0380  1122        PB    BSS   2              7-DELTA P BIAS
0390  1124        DPC   BSS   2              8-DELTA P CMD,ANALOG
0400  1126        *
0410  1126        *     INITIALIZED RAM
0420  1126        *
0430  1126        FLAG  BSS   2          SYSTEM FLAG WORD
0440  1128        TDAT  BSS   66         TEMP CTL DATASET
0450  116A        PDAT  BSS   66         VAP PRESS CTL DATASET
0460  11AC        FDAT  BSS   66         LIQ PRESS CTL DATASET
0470  11EE        ADCT  BSS   16         A/D SUMS
0480  11FE        DPCC  BSS   2          DPC CMD FROM TEMP LOOP
0490  1200        HRS   BSS   2          HOUR CTR
0500  1202        MIN   BSS   2          MIN CTR
0510  1204        SEC   BSS   2          SEC CTR
```

```
0511 1206           TCNT  BSS  2              TEMP LOOP COUNT
0512 1208           PCNT  BSS  2              VAP PRESS LOOP CTR
0513 120A           FCNT  BSS  2              LIQ LOOP COUNT
0514 120C           CKNT  BSS  2              CLK CTS.
0515 120E           LCNT  BSS  2              LOG LOOP CNTS.
0516 1210           QCNT  BSS  2              A/D LOOP CNTS
0517 1212           TICS  BSS  2              CLK TICKS/SEC
0518 1214           DEND  BSS  2
0520 1216     *
0530 1216     *
0540 1216     *     REGISTER EQUATES
0550 1216     *
0560      0000 R0   EQU  0
0570      0001 R1   EQU  1
0580      0002 R2   EQU  2
0590      0003 R3   EQU  3
0600      0004 R4   EQU  4
0610      0005 R5   EQU  5
0620      0006 R6   EQU  6
0630      0007 R7   EQU  7
0640      0008 R8   EQU  8
0650      0009 R9   EQU  9
0660      000A R10  EQU  10
0670      000B R11  EQU  11
0680      000C R12  EQU  12
0690      000D R13  EQU  13
0700      000E R14  EQU  14
0710      000F R15  EQU  15
0720      0010 P0   EQU  16             PARALLEL I/O BIT 0
0730      0011 P1   EQU  17                              1
0740      0012 P2   EQU  18                              2
0750      0013 P3   EQU  19                              3
0760      0014 P4   EQU  20                              4
0770      0015 P5   EQU  21                              5
0780      0016 P6   EQU  22                              6
0790 1216     *
0800 1216     *     I/O BOARD INTERFACE EQUATES
0810 1216     *
0820      DFF0 DAC2 EQU  >DFF0          DAC 2 DATA
0830      DFF2 DAC1 EQU  >DFF2          DAC 1 DATA
0840      DFF4 SET  EQU  >DFF4          SETUP:INT,SCAN,CC
0850      DFF6 GAIN EQU  >DFF6          00=1,11=8
0860      DFF8 MUX  EQU  >DFF8          MUX ADDRESS
0870      DFFA CONV EQU  >DFFA          CONVERT A/D
0880      DFFC STAT EQU  >DFFC          STATUS:EOC,U/R
0890      DFFE ADC  EQU  >DFFE          RESULT OF A/D
0900 1216     *
0910 1216     *     MAIN PROGRAM
0920 1216     *
0930 2000           AORG >2000
0931 2000     *
0932 2000     *     INIT RAM DATA
0933 2000     *
0934 2000 02E0 INIT LWPI WSP0
     2002 1000
0935 2004 0201      LI   R1,DTAB        ROM DATA START
     2006 25D8
0936 2008 0202      LI   R2,FLAG        RAM DATA START
     200A 1126
0937 200C CCB1 M010 MOV  *R1+,*R2+      COPY DATA
0938 200E 0282      CI   R2,DEND        DONE?
     2010 1214
0939 2012 16FC      JNE  M010
0940 2014 0460      B    @MAIN
     2016 2100
```

```
0941 2018         *         ENTRY FOR NO INIT DATA
0942 2018         *
0943 2100                   AORG  >2100
0944 2100 02E0 MAIN  LWPI WSP0
     2102 1000
0950 2104 020F         LI    R15,STK0      BACKROUND STACK UP
     2106 1080
0960 2108         *
0970 2108         *   SET UP INTERRUPT VECTORS 3 AND 6
0980 2108         *
0990 2108 0201         LI    R1,WSP2       WSP2=CLK INT WS
     210A 1040
1000 210C C801         MOV   R1,@>000C
     210E 000C
1010 2110 0201         LI    R1,C000       CLK INT ADDRESS
     2112 22F2
1020 2114 C801         MOV   R1,@>000E
     2116 000E
1030 2118 0201         LI    R1,WSP1       WSP1=CONTROL (INT6) WS
     211A 1020
1040 211C C801         MOV   R1,@>0018
     211E 0018
1050 2120 0201         LI    R1,P000       CONTROL ADDRESS
     2122 2384
1060 2124 C801         MOV   R1,@>001A
     2126 001A
1150 2128         *
1160 2128         *   SET UP A/D
1170 2128         *
1180 2128 04E0         CLR   @DAC1         DAC1=0
     212A DFF2
1190 212C 04E0         CLR   @DAC2         DAC2=0
     212E DFF0
1200 2130 04E0         CLR   @GAIN         A/D GAIN=1
     2132 DFF6
1210 2134 0201         LI    R1,>4000      AUTO INCREMENT A/D
     2136 4000
1220 2138 C801         MOV   R1,@SET       A/D SETUP
     213A DFF4
1230 213C         *
1240 213C         *   KICKOFF CLOCK INT
1250 213C         *
1260 213C C820         MOV   @QCNT,@QTIM   INIT BASE TIMER LOOP CTR
     213E 1210
     2140 10A4
1270 2142 C820         MOV   @TCNT,@TTIM   INIT TEMP LOOP TIMER
     2144 1206
     2146 10AA
1280 2148 C820         MOV   @FCNT,@FTIM   INIT LIQ LOOP TIMER
     214A 120A
     214C 10A6
1290 214E C820         MOV   @PCNT,@PTIM   INIT PRESS LOOP TIMER
     2150 1208
     2152 10A8
1300 2154 C820         MOV   @LCNT,@LTIM   INIT LOG LOOP TIMER
     2156 120E
     2158 10AC
1310 215A C820         MOV   @TICS,@DTIM   INIT TICS/SEC CTR
     215C 1212
     215E 110E
1320 2160         *
1330 2160 020C         LI    R12,>14C      CLEAR INT6 FLOP
     2162 014C
1340 2164 1E00         SBZ   0
1350 2166         *
```

```
1360 2166 020C       LI    R12,>100         9901 CRU BASE ADDRESS
     2168 0100
1370 216A       *
1380 216A 1E10       SBZ   P0               RESET PARALLEL I/O LINES(0-6)
1390 216C 1E11       SBZ   P1
1400 216E 1E12       SBZ   P2
1410 2170 1E13       SBZ   P3
1420 2172 1E14       SBZ   P4
1430 2174 1E15       SBZ   P5
1440 2176 1E16       SBZ   P6
1450 2178       *
1460 2178 1E00       SBZ   0                9901 TO INTERRUPT MODE
1470 217A 1D03       SBO   3                ENABLE INT3 FOR CLK
1480 217C 1D06       SBO   6                ENABLE INT6 ON 9901
1490 217E 0300       LIMI  6                ENABLE INT 1-6
     2180 0006
1500 2182 0201       LI    R1,11            CLK CNT OF 10+CLK MODE BIT
     2184 000B
1510 2186 33C1       LDCR  R1,15            15 BITS OUT,CNT AND CLK MODE
1520 2188       *
1530 2188       *    DATA LOGGING ROUTINE   *
1540 2188       *
1550 2188 C820 M020  MOV   @LTIM,@LTIM      TIME TO RUN/
     218A 10AC
     218C 10AC
1560 218E 15FC       JGT   M020
1570 2190       *
1580 2190 0300       LIMI  0                DISABLE INTERRUPTS+SNAPSHOT
     2192 0000
1581 2194 C820       MOV   @LCNT,@LTIM      RESET LOG CTR
     2196 120E
     2198 10AC
1590 219A C820       MOV   @HRS,@HRS0
     219C 1200
     219E 1110
1600 21A0 C820       MOV   @MIN,@MIN0
     21A2 1202
     21A4 1112
1610 21A6 C820       MOV   @SEC,@SEC0
     21A8 1204
     21AA 1114
1620 21AC 0200       LI    R0,8             CTR
     21AE 0008
1630 21B0 0206       LI    R6,PF            SUMMED A/D VALUES
     21B2 1116
1640 21B4 0207       LI    R7,LTAB          LOG TABLE
     21B6 10AE
1650 21B8 CDF6 M030  MOV   *R6+,*R7+        COPY A/D SUM
1660 21BA 0600       DEC   R0
1670 21BC 15FD       JGT   M030
1680 21BE 0209       LI    R9,TDAT
     21C0 1128
1690 21C2 CDE9       MOV   @ERR(R9),*R7+
     21C4 000C
1700 21C6 CDE9       MOV   @RATE(R9),*R7+
     21C8 0018
1701 21CA CDE9       MOV   @EI(R9),*R7+
     21CC 0004
1702 21CE CDE9       MOV   @MODE(R9),*R7+
     21D0 003A
1710 21D2 CDE9       MOV   @OUT(R9),*R7+
     21D4 000A
1720 21D6 0209       LI    R9,PDAT
     21D8 116A
```

```
1730 21DA CDE9        MOV   @ERR(R9),*R7+
     21DC 000C
1740 21DE CDE9        MOV   @RATE(R9),*R7+
     21E0 0018
1741 21E2 CDE9        MOV   @EI(R9),*R7+
     21E4 0004
1742 21E6 CDE9        MOV   @MODE(R9),*R7+
     21E8 003A
1750 21EA CDE9        MOV   @OUT(R9),*R7+
     21EC 000A
1760 21EE 0209        LI    R9,FDAT
     21F0 11AC
1770 21F2 CDE9        MOV   @ERR(R9),*R7+
     21F4 000C
1780 21F6 CDE9        MOV   @RATE(R9),*R7+
     21F8 0018
1781 21FA CDE9        MOV   @EI(R9),*R7+
     21FC 0004
1782 21FE CDE9        MOV   @MODE(R9),*R7+
     2200 003A
1790 2202 CDE9        MOV   @OUT(R9),*R7+
     2204 000A
1800 2206 0300        LIMI  6
     2208 0006
1810 220A        *
1820 220A 0200        LI    R0,CRLF       CARRIAGE RTN/LINE FEED
     220C 26C6
1830 220E 0420        BLWP  @>E01C
     2210 E01C
1831 2212 0200        LI    R0,CRLF
     2214 26C6
1832 2216 0420        BLWP  @>E01C
     2218 E01C
1840 221A C020        MOV   @HRS0,R0
     221C 1110
1850 221E 0201        LI    R1,BUFF
     2220 10EE
1860 2222 0420        BLWP  @>E00C        CONVERT TO ASCII
     2224 E00C
1870 2226 DC60        MOVB  @COLO,*R1+
     2228 26DA
1880 222A C020        MOV   @MIN0,R0
     222C 1112
1890 222E 0420        BLWP  @>E00C
     2230 E00C
1900 2232 DC60        MOVB  @COLO,*R1+
     2234 26DA
1910 2236 C020        MOV   @SEC0,R0
     2238 1114
1920 223A 0420        BLWP  @>E00C
     223C E00C
1930 223E 0281 M035   CI    R1,BF10
     2240 10F8
1940 2242 1304        JEQ   M038
1950 2244 1503        JGT   M038
1960 2246 DC60        MOVB  @BLNK,*R1+
     2248 26CA
1970 224A 10F9        JMP   M035
1980 224C D460 M038   MOVB  @DEC0,*R1
     224E 26E0
1990 2250 0200        LI    R0,BUFF
     2252 10EE
2000 2254 0420        BLWP  @>E01C        PRINT IT
     2256 E01C
2010 2258 0209        LI    R9,8          CTR
     225A 0008
```

```
2020 225C 0206        LI    R6,LTAB      LOG TABLE
     225E 10AE
2030 2260 0207        LI    R7,LDAT      LOG SCALE DATA
     2262 26E8
2031 2264 06A0        BL    @M040
     2266 226C
2032 2268 0460        B     @M100
     226A 22B2
2040 226C        *
2041 226C        *    INLINE SUBROUTINE TO CONVERT AND PRINT A LINE
2042 226C        *
2050 226C 04C8  M040  CLR   R8           SIGN FLAG
2060 226E C0B6        MOV   *R6+,R2      DATA IN R2
2070 2270 1502        JGT   M050         JMP IF +
2080 2272 0502        NEG   R2           NEGATE
2090 2274 0708        SETO  R8           R8=-1
2100 2276 38B7  M050  MPY   *R7+,R2      DATA*A1
2110 2278 3CB7        DIV   *R7+,R2      DATA*A1/A2
2120 227A C037        MOV   *R7+,R0      SET UP ADD
2130 227C C208        MOV   R8,R8        +/- TEST
2140 227E 1102        JLT   M060
2150 2280 A002        A     R2,R0        DATA*A1/A2+A3
2160 2282 1001        JMP   M070
2170 2284 6002  M060  S     R2,R0        A3-A1*DATA/A2
2180 2286 0201  M070  LI    R1,BUFF      SET UP CONVERT
     2288 10EE
2190 228A 0420        BLWP  @>E00C       CONVERT TO ASCII
     228C E00C
2200 228E 0281  M080  CI    R1,BUF6
     2290 10F4
2210 2292 1304        JEQ   M090
2220 2294 1503        JGT   M090
2230 2296 DC60        MOVB  @BLNK,*R1+
     2298 26CA
2240 229A 10F9        JMP   M080
2250 229C DC60  M090  MOVB  @BLNK,*R1+
     229E 26CA
2260 22A0 D460        MOVB  @DEC0,*R1
     22A2 26E0
2270 22A4 0200        LI    R0,BUFF      PRINT IT
     22A6 10EE
2280 22A8 0420        BLWP  @>E01C
     22AA E01C
2290 22AC 0609        DEC   R9
2300 22AE 15DE        JGT   M040
2301 22B0 045B        RT
2310 22B2        *
2311 22B2 0200  M100  LI    R0,BL10      10 BLNKS
     22B4 26CC
2315 22B6 0420        BLWP  @>E01C
     22B8 E01C
2320 22BA 0209        LI    R9,5         5 OUTPUTS
     22BC 0005
2325 22BE 0207        LI    R7,LD1
     22C0 2718
2330 22C2 06A0        BL    @M040
     22C4 226C
2335 22C6 0200        LI    R0,BL10
     22C8 26CC
2340 22CA 0420        BLWP  @>E01C
     22CC E01C
2345 22CE 0209        LI    R9,5
     22D0 0005
2350 22D2 0207        LI    R7,LD1
     22D4 2718
```

```
2355 22D6 06A0          BL    @M040
     22D8 226C
2360 22DA 0200          LI    R0,BL10
     22DC 26CC
2365 22DE 0420          BLWP  @>E01C
     22E0 E01C
2370 22E2 0209          LI    R9,5
     22E4 0005
2375 22E6 0207          LI    R7,LD1
     22E8 2718
2380 22EA 06A0          BL    @M040
     22EC 226C
2385 22EE 0460          B     @M020
     22F0 2188
2410 22F2        *
2420 22F2        *     CLOCK INTERRUPT AND A/D INPUT ROUTINE
2430 22F2        *
2440 22F2 020C C000     LI    R12,>100       9901 CRUBASE
     22F4 0100
2450 22F6 1D10          SBO   P0             SET P0
2460 22F8        *
2470 22F8        *     RESTART CLOCK
2480 22F9        *
2490 22F8 1E00 C010     SBZ   0              9901 TO INTERRUPT MODE
2500 22FA 1D03          SBO   3              ENABLE INTER.3 ON 9901
2510 22FC C060          MOV   @CKNT,R1       SET UP CLK CNT FOR 12.5 MS
     22FE 120C
2520 2300 33C1          LDCR  R1,15          15 BITS;CLOCK MODE AND SET COUNT T
2530 2302        *
2540 2302 0201          LI    R1,8           CTR
     2304 0008
2550 2306 0202          LI    R2,ADCT        A/D SUMMER TABLE PTR
     2308 11EE
2560 230A 04E0          CLR   @MUX           SET MUX TO CHNL 0
     230C DFF8
2570 230E 04E0 C020     CLR   @CONV          KICK OFF CONVERSION
     2310 DFFA
2580 2312 0560 C030     INV   @STAT          TEST FOR EOC
     2314 DFFC
2590 2316 11FD          JLT   C030           WAIT FOR A/D
2600 2318 ACA0          A     @ADC,*R2+      SUM IT
     231A DFFE
2610 231C 0601          DEC   R1             DONE ALL CHNLS?
2620 231E 15F7          JGT   C020           LOOP IF NOT
2630 2320        *
2640 2320 0620          DEC   @DTIM          1 SEC?
     2322 110E
2650 2324 1515          JGT   C035
2660 2326 C820          MOV   @TICS,@DTIM
     2328 1212
     232A 110E
2670 232C 05A0          INC   @SEC
     232E 1204
2680 2330 8820          C     @SEC,@D60
     2332 1204
     2334 26DE
2690 2336 110C          JLT   C035
2700 2338 05A0          INC   @MIN
     233A 1202
2710 233C 04E0          CLR   @SEC
     233E 1204
2720 2340 8820          C     @MIN,@D60
     2342 1202
     2344 26DE
2730 2346 1104          JLT   C035
```

```
2740 2348 05A0          INC   @HRS
     234A 1200
2750 234C 04E0          CLR   @MIN
     234E 1202
2760 2350         *
2770 2350 0620 C035     DEC   @LTIM          DEC LOG TIMER
     2352 10AC
2780 2354 0620          DEC   @QTIM          TIME FOR CONTROL?
     2356 10A4
2790 2358 1612          JNE   C100           ?
2800 235A         *
2810 235A 0201          LI    R1,10          P6 HI LOOP
     235C 000A
2820 235E 1D16 C040     SBO   P6             P6=1
2830 2360 0601          DEC   R1
2840 2362 15FD          JGT   C040
2850 2364         *
2860 2364 0202          LI    R2,PF          COPY A/D SUMS
     2366 1116
2870 2368 0201          LI    R1,ADCT
     236A 115E
2880 236C 0200          LI    R0,8           CTR
     236E 0008
2890 2370 CC91 C050     MOV   *R1,*R2+
2900 2372 04F1          CLR   *R1+
2910 2374 0600          DEC   R0
2920 2376 15FC          JGT   C050
2930 2378 C820          MOV   @QCNT,@QTIM    RESET TIMER
     237A 1210
     237C 10A4
2940 237E         *
2950 237E 1E16 C100     SBZ   P6             P6=0
2960 2380 1E10          SBZ   P0             P0=0
2970 2382 0380          RTWP
2980 2384         *     CONTROL LOOPS-ENTERED ON INT6
2990 2384         *
3000 2384
3010 2384 C80F P000    MOV   R15,@SR15      SAVE STATUS LINK
     2386 10A2
3020 2388 020F          LI    R15,STK1       CONTROL STK UP
     238A 10A0
3030 238C 020C          LI    R12,>100       9901 CRUBASE UP
     238E 0100
3040 2390 1D11          SBO   P1             P1=1
3050 2392 1D06          SBO   6              CLEAR INT6 9901
3060 2394         *
3070 2394 C2A0          MOV   @FLAG,R10      FLAGWORD TO R10
     2396 1126
3080 2398 0620          DEC   @PTIM          RUN VPRESS
     239A 10A8
3090 239C 1505          JGT   P010
3100 239E 06A0          BL    @VCTL          VAPOR PRESSURE CONTROL
     23A0 240A
3110 23A2 C820          MOV   @PCNT,@PTIM
     23A4 1208
     23A6 10A8
3120 23A8 0620 P010     DEC   @FTIM          RUN LIQ PRESS CNTL?
     23AA 10A6
3130 23AC 1505          JGT   P020
3140 23AE 06A0          BL    @FCTL          LIQ PRECC CONTROL
     23B0 2432
3150 23B2 C820          MOV   @FCNT,@FTIM
     23B4 120A
     23B6 10A6
3160 23B8 0620 P020     DEC   @TTIM          RUN TEMP CONTROL?
     23BA 10AA
```

```
3170 23BC 1505          JGT   P030
3180 23BE 06A0          BL    @TCTL        TEMP CONTROL
     23C0 244A
3190 23C2 C820          MOV   @TCNT,@TTIM
     23C4 1206
     23C6 10AA
3200 23C8         *
3210 23C8         *     OUTPUTS
3220 23C8         *
3230 23C8 0209 P030 LI  R9,FDAT      LIQ PRESS OUTPUT
     23CA 11AC
3240 23CC C069          MOV   @OUT(R9),R1
     23CE 000A
3250 23D0 0501          NEG   R1
3270 23D2 C801          MOV   R1,@DAC2
     23D4 DFF0
3280 23D6 C820          MOV   @FLAG,@FLAG  FLAG=0 MEANS DO VAP PRESS
     23D8 1126
     23DA 1126
3290 23DC 1608          JNE   P035         DO TEMP CTL IF FLAG NOT 0
3300 23DE         *
3310 23DE 0209          LI    R9,PDAT      DO VAPOR PRESS CNTL
     23E0 116A
3320 23E2 C069          MOV   @OUT(R9),R1
     23E4 000A
3330 23E6 0501          NEG   R1
3340 23E8 C801          MOV   R1,@DAC1
     23EA DFF2
3350 23EC 1007          JMP   P040
3360 23EE         *
3370 23EE 0209 P035 LI  R9,TDAT      TEMP CONTROL
     23F0 1128
3380 23F2 C069          MOV   @OUT(R9),R1
     23F4 000A
3390 23F6 0501          NEG   R1
3400 23F8 C801          MOV   R1,@DAC1
     23FA DFF2
3410 23FC         *
3420 23FC 1E11 P040 SBZ P1
3430 23FE         *
3440 23FE         *
3450 23FE 020C          LI    R12,>14C     CLEAR INT6 FLOP
     2400 014C
3460 2402 1E00          SBZ   0
3470 2404 C3E0          MOV   @SR15,R15    RESET RETURN ST LINKAGE
     2406 10A2
3480 2408 0380          RTWP               RETURN
3490 240A         *
3500 240A         *     CONTROL SETUP ROUTINES
3510 240A         *
3520 240A 064F VCTL DECT R15             VAPOR PRESS
3530 240C C7CB          MOV   R11,*R15
3540 240E C020          MOV   @PU,R0
     2410 1118
3550 2412 6020          S     @PF,R0       PU-PF
     2414 1116
3560 2416 0209          LI    R9,TDAT
     2418 1128
3570 241A C069          MOV   @OUT(R9),R1  DP CMD FROM TEMP LOOP
     241C 000A
3580 241E A001          A     R1,R0        DPCMD-(PF-PU)
3590 2420 6020          S     @PB,R0       DPCMD-(PF-PU)+PB
     2422 1122
3595 2424 0500          NEG   R0           ERR=(PF-PU)-DPCMD-PB
3600 2426 0209          LI    R9,PDAT      VPRESS DATASET
     2428 116A
```

```
3610 242A 06A0            BL      @PID
     242C 2462
3620 242E C2FF            MOV     *R15+,R11
3630 2430 045B            RT
3640 2432         *
3650 2432 064F  FCTL      DECT    R15             LIQUID PRESS
3660 2434 C7CB            MOV     R11,*R15
3670 2436         *
3680 2436 C020            MOV     @PFS,R0
     2438 111E
3690 243A 6020            S       @PF,R0          PFS-PF
     243C 1116
3700 243E 0209            LI      R9,FDAT         LIQ PRESS DATASET
     2440 11AC
3710 2442 06A0            BL      @PID
     2444 2462
3720 2446 C2FF            MOV     *R15+,R11
3730 2448 045B            RT
3740 244A         *
3750 244A 064F  TCTL      DECT    R15             TEMP CTL
3760 244C C7CB            MOV     R11,*R15
3770 244E         *
3780 244E C020            MOV     @T,R0
     2450 111A
3790 2452 6020            S       @TS,R0          T-TS
     2454 111C
3800 2456 0209            LI      R9,TDAT
     2458 1129
3810 245A 06A0            BL      @PID
     245C 2462
3820 245E C2FF            MOV     *R15+,R11
3830 2460 045B            RT
3840 2462         *
3850 2462         *       PID SUBROUTINE
3860 2462         *
3870 2462 064F  PID       DECT    R15
3871 2464 C7CB            MOV     R11,*R15
3872 2466         *
3873 2466         *       UPDATE ERROR TABLE
3874 2466         *
3875 2466 C149            MOV     R9,R5           R5=TABLE PTR
3876 2468 0225            AI      R5,E10          R5=TABLE PTR+E10
     246A 001C
3877 246C C185            MOV     R5,R6
3878 246E 05C6            INCT    R6              R6=NEXT TABLE ENTRY
3879 2470 C1C9            MOV     R9,R7           R7=TABLE PTR
3880 2472 0227            AI      R7,E0           LAST TABLE ENTRY,E0
     2474 0030
3881 2476 CD76  PI02      MOV     *R6+,*R5+       BUMP TABLE ENTRIES
3882 2478 81C6            C       R6,R7           DONE?
3883 247A 11FD            JLT     PI02
3884 247C 13FC            JEQ     PI02
3885 247E CA40            MOV     R0,@E0(R9)      COPY ERR TO TABLE BOTTOM
     2480 0030
3891 2482 C040            MOV     R0,R1           COPY TO R1
3892 2484 6069            S       @ERR(R9),R1     DELTA ERROR
     2486 000C
3893 2488 1505            JGT     PI04
3894 248A 0501            NEG     R1
3895 248C 3869            MPY     @EFLT(R9),R1
     248E 001A
3896 2490 0501            NEG     R1
3897 2492 1002            JMP     PI06
3898 2494 3869  PI04      MPY     @EFLT(R9),R1
     2496 001A
```

```
3899 2498 AA41 PI06  A    R1,@ERR(R9)      UPDATE ERR
     249A 000C
3900 249C          *
3901 249C          *   TEST FOR RESET MODE
3902 249C          *
3903 249C 05A9         INC  @MODE(R9)
     249E 003A
3904 24A0 1505         JGT  PI07
3905 24A2 CA69         MOV  @MOD0(R9),@OUT(R9) RESET
     24A4 0040
     24A6 000A
3906 24A8 0460         B    @PI99
     24AA 25B8
3907 24AC 8A69 PI07    C    @MODE(R9),@MOD2(R9)
     24AE 003A
     24B0 003E
3908 24B2 1103         JLT  PI08
3909 24B4 CA69         MOV  @MOD2(R9),@MODE(R9)
     24B6 003E
     24B8 003A
3910 24BA C069 PI08    MOV  @ERR(R9),R1
     24BC 000C
3911 24BE 8A41         C    R1,@CHI(R9)      ERR>CHI?
     24C0 0034
3912 24C2 155C         JGT  PI85             JMP IF SO
3913 24C4 8A41         C    R1,@CLO(R9)      ERR<CLO?
     24C6 0032
3914 24C8 1163         JLT  PI90
3916 24CA          *
3917 24CA          *   IN LIMITS, DO NORMAL PID
3918 24CA          *
3919 24CA C041         MOV  R1,R1            PROPORTIONAL TERM
3920 24CC 1505         JGT  PI10             JMP IF +
3930 24CE 0501         NEG  R1
3940 24D0 3869         MPY  @GP(R9),R1
     24D2 0000
3950 24D4 0501         NEG  R1
3960 24D6 1002         JMP  PI20
3970 24D8 3869 PI10    MPY  @GP(R9),R1
     24DA 0000
3980 24DC C181 PI20    MOV  R1,R6            LIMIT PROP TERM
3981 24DE 0205         LI   R5,>3FF          LIMIT TO 1023
     24E0 03FF
3982 24E2 06A0         BL   @LIM
     24E4 25BC
3983 24E6 0A36         SLA  R6,3             MPY BY 8
3984 24E8 CA46         MOV  R6,@OUT(R9)      LIMIT TO >2000
     24EA 000A
3985 24EC          *
3986 24EC          *   INTEGRAL TERM
3987 24EC          *
3990 24EC C069         MOV  @ERR(R9),R1      ERR TO R1
     24EE 000C
4000 24F0 1505         JGT  PI30
4010 24F2 0501         NEG  R1
4020 24F4 3869         MPY  @GI(R9),R1
     24F6 0002
4030 24F8 0501         NEG  R1               GI*ERR
4040 24FA 1002         JMP  PI40
4050 24FC 3869 PI30    MPY  @GI(R9),R1
     24FE 0002
4060 2500 AA41 PI40    A    R1,@EI(R9)       ERR INT
     2502 0004
4070 2504 C169         MOV  @IL(R9),R5
     2506 0006
```

```
4080 2508 C1A9          MOV    @EI(R9),R6
     250A 0004
4090 250C 06A0          BL     @LIM              LIMIT INTEGRAL
     250E 25BC
4095 2510 CA46          MOV    R6,@EI(R9)        RESTORE EI
     2512 0004
4100 2514 0856          SRA    R6,5              DIV BY 32 FOR SCALING DOWN
4101 2516 AA46          A      R6,@OUT(R9)       ADD TO OUT EI/32
     2518 000A
4110 251A        *
4111 251A        *      RATE TERM
4112 251A        *
4115 251A C069          MOV    @E0(R9),R1        ERR NOW
     251C 0030
4116 251E C189          MOV    R9,R6             TABLE PTR
4117 2520 0226          AI     R6,E0             R6 POINTS TO E0
     2522 0030
4119 2524 61A9          S      @ERPL(R9),R6      R6 POINTS AT LAST ERROR
     2526 000E
4120 2528 6056          S      *R6,R1            INSTANT RATE IN R1
4121 252A 6069          S      @RATE(R9),R1      DELTA RATE IN R1
     252C 0018
4140 252E 1505          JGT    PI50
4150 2530 0501          NEG    R1
4160 2532 3869          MPY    @FILT(R9),R1      FILTER RATE
     2534 0010
4170 2536 0501          NEG    R1
4180 2538 1002          JMP    PI60
4190 253A 3869  PI50    MPY    @FILT(R9),R1
     253C 0010
4200 253E AA41  PI60    A      R1,@RATE(R9)
     2540 0018
4205 2542        *                                FILTERED RATE
4210 2542 C069          MOV    @RATE(R9),R1
     2544 0018
4220 2546 1505          JGT    PI70
4260 2548 0501          NEG    R1
4270 254A 3869          MPY    @GD(R9),R1
     254C 0012
4280 254E 0501          NEG    R1
4290 2550 1002          JMP    PI80
4300 2552 3869  PI70    MPY    @GD(R9),R1
     2554 0012
4310 2556 C181  PI80    MOV    R1,R6             LIMIT RATE TERM
4320 2558 C169          MOV    @RLIM(R9),R5
     255A 0014
4330 255C 06A0          BL     @LIM
     255E 25BC
4335 2560 0A36          SLA    R6,3              MPY BY 8
4340 2562 AA46          A      R6,@OUT(R9)
     2564 000A
4350 2566 C1A9          MOV    @OUT(R9),R6       LIMIT GP*ERR+EI+GD*RATE
     2568 000A
4355 256A A1A9          A      @BIAS(R9),R6      ADD BIAS
     256C 0016
4360 256E C169          MOV    @OL(R9),R5
     2570 0008
4370 2572 06A0          BL     @LIM
     2574 25BC
4380 2576 CA46          MOV    R6,@OUT(R9)
     2578 000A
4391 257A 101E          JMP    PI99              RT
4392 257C        *
4393 257C 8A69  PI85    C      @MODE(R9),@MOD2(R9) NO RESET IF MODE<MOD2
     257E 003A
     2580 003E
```

```
4394 2582 1310          JEQ   PI97            RESET IF EQUAL
4395 2584 CA69          MOV   @OTHI(R9),@OUT(R9)
     2586 0038
     2588 000A
4396 258A 04E9          CLR   @EI(R9)
     258C 0004
4397 258E 1014          JMP   PI99
4398 2590        *
4399 2590 8A69 PI90     C     @MODE(R9),@MOD2(R9) RESET?
     2592 003A
     2594 003E
4400 2596 1306          JEQ   PI97            RESET IF EQUAL
4401 2598 CA69          MOV   @OTLO(R9),@OUT(R9)
     259A 0036
     259C 000A
4402 259E 04E9          CLR   @EI(R9)
     25A0 0004
4403 25A2 100A          JMP   PI99
4404 25A4        *
4405 25A4 04E9 PI97     CLR   @EI(R9)         RESET
     25A6 0004
5270 26CE 2020          TEXT
     26D0 2020
     26D2 2020
     26D4 2020
     26D6 2020
5280 26D8 0000          BYTE  0,0
5290 26DA 3A3A COLO     TEXT  ':;'
5300 26DC 0000          BYTE  0,0
5310 26DE 003C D60      DATA  60              60
5320 26E0 0000 DEC0     BYTE  0,0             ZERO
5330 26E2 8000 B0       DATA  >8000           BIT0
5340 26E4 4000 B1       DATA  >4000           BIT1
5350 26E6 2000 B2       DATA  >2000           BIT2
5420 26E8 03E8 LDAT     DATA  1000,16384,3000 LOG SCALING DATA TABLE
     26EA 4000
     26EC 0BB8
5430 26EE 03E8          DATA  1000,16384,2000
     26F0 4000
     26F2 07D0
5440 26F4 03E8          DATA  1000,10240,8500
     26F6 2800
     26F8 2134
5450 26FA 03E8          DATA  1000,10240,8500
     26FC 2800
     26FE 2134
5460 2700 03E8          DATA  1000,16384,3000
     2702 4000
     2704 0BB8
5470 2706 03E8          DATA  1000,16384,0
     2708 4000
     270A 0000
5480 270C 03E8          DATA  1000,16384,0
     270E 4000
     2710 0000
5490 2712 03E8          DATA  1000,16384,0
     2714 4000
     2716 0000
5500 2718        *
5510 2718        *      CONTROL OUTPUTS,SCALING
5520 2718        *
5530 2718 0001 LD1      DATA  1,1,0           CNTRL DATA SCALING
     271A 0001
     271C 0000
```

```
5540 271E 0001        DATA 1,1,0
     2720 0001
     2722 0000
5550 2724 0001        DATA 1,1,0
     2726 0001
     2728 0000
5570 272A 0001        DATA 1,1,0
     272C 0001
     272E 0000
5580 2730 0001        DATA 1,1,0
     2732 0001
     2734 0000
5610 2736 0001        DATA 1,1,0
     2738 0001
     273A 0000
5620      2000        END   INIT
ERRORS=0
5019 264E F380        DATA -3200           CLO,2 V
5020 2650 0C80        DATA 3200            CHI,2 V
5021 2652 F801        DATA -2047           OTLO
5022 2654 07FF        DATA 2047            OTHI
5023 2656 0000        DATA 0               MODE
5024 2658 001E        DATA 30              MOD1
5025 265A 001E        DATA 30              MOD2,30 SEC
5026 265C F801        DATA -2047           MODO
5029 265E 0800        DATA >800       LIQ  GP
5030 2660 1000        DATA >1000           GI
5040 2662 0000        DATA 0               EI
5050 2664 6000        DATA >6000           IL
5060 2666 0550        DATA 1360            OL
5070 2668 0000        DATA 0               OUT
5080 266A 0000        DATA 0               ERR
5090 266C 0004        DATA 4               ERRL
5100 266E 8000        DATA >8000           FILT
5110 2670 0000        DATA 0          GD
5120 2672 0400        DATA >400            RLIM
5130 2674 FE0C        DATA -500            BIAS
5131 2676 0000        DATA 0               RATE
5132 2678 8000        DATA >8000           EFLT
5133 267A 0000        DATA 0,0,0,0,0,0     ERROR TABLE
     267C 0000
     267E 0000
     2680 0000
     2682 0000
     2684 0000
5134 2686 0000        DATA 0,0,0,0,0
     2688 0000
     268A 0000
     268C 0000
     268E 0000
5137 2690 F380        DATA -3200           CLO,-2 V
5138 2692 0C80        DATA 3200            CHI
5139 2694 FAB0        DATA -1360           OTLO
5140 2696 0550        DATA 1360            OTHI
5141 2698 0000        DATA 0               MODE
5142 269A 001E        DATA 30              MOD1,30 SEC
5143 269C 003C        DATA 60              MOD2,60 SEC
5144 269E FAB0        DATA -1360           MODO
5149 26A0 0000        DATA 0               A/D INIT VALUES
5150 26A2 0000        DATA 0
5160 26A4 0000        DATA 0
5170 26A6 0000        DATA 0
5180 26A8 0000        DATA 0
5190 26AA 0000        DATA 0
```

```
5200 26AC 0000           DATA  0
5210 26AE 0000           DATA  0
5220 26B0 0000           DATA  0           DPCC INIT
5221 26B2 0000           DATA  0           HRS
5222 26B4 0000           DATA  0           MIN
5223 26B6 0000           DATA  0           SEC
5224 26B8 0004           DATA  4           TCNT,1 SEC
5225 26BA 0001           DATA  1           PCNT,1/4 SEC
5226 26BC 0004           DATA  4           FCNT,1 SEC
5227 26BE 0B71           DATA  2929        CKNT,32 HZ
5228 26C0 01E0           DATA  480         LCNT,15 SEC
5229 26C2 0008           DATA  8           QCNT,4 HZ
5230 26C4 0020           DATA  32          TICS/SEC
5240 26C6 0D0A  CRLF     BYTE  >0D,>0A,0,0  CARRIAGE RTN/LINE FEED
     26C8 0000
5250 26CA 2020  BLNK     BYTE  >20,>20     BLANK
5260 26CC 0D0A  BL10     BYTE  >0D,>0A
4755      0040  MODO     EQU   64
4765 25D8       *
4766 25D8       *        ROM COPY TABLE
4767 25D8       *
4770 25D8 8000  DTAB     DATA  >8000       FLAG
4780 25DA 2000           DATA  >2000       TEMP GP //2S
4790 25DC 2000           DATA  >2000            GI
4800 25DE 0000           DATA  0                EI
4810 25E0 6000           DATA  >6000            IL
4820 25E2 07FF           DATA  >7FF             OL
4830 25E4 0000           DATA  0                OUT
4840 25E6 0000           DATA  0                ERR
4850 25E8 0008           DATA  8                ERRL
4860 25EA 8000           DATA  >8000            FILT
4870 25EC 0000           DATA  0                GD
4880 25EE 0400           DATA  >400             RLIM
4890 25F0 0000           DATA  0           BIAS
4895 25F2 0000           DATA  0           RATE
4896 25F4 8000           DATA  >8000            EFLT
4897 25F6 0000           DATA  0,0,0,0,0   ERR TABLE
     25F8 0000
     25FA 0000
     25FC 0000
     25FE 0000
     2600 0000
4898 2602 0000           DATA  0,0,0,0,0
     2604 0000
     2606 0000
     2608 0000
     260A 0000
4899 260C F380           DATA  -3200       CLO,-2 VOLTS
4900 260E 0C80           DATA  3200        CHI 2 V
4901 2610 F801           DATA  -2047       OTHI
4902 2612 07FF           DATA  2047        OTLO
4903 2614 0000           DATA  0           MODE
4904 2616 0014           DATA  20          MOD1,20 SEC
4905 2618 012C           DATA  300         MOD2,5 MIN
4906 261A 07FF           DATA  2047        MODO,10 V
4909 261C 4000           DATA  >4000       VAPOR GP
4910 261E 0000           DATA  0                GI
4920 2620 0000           DATA  0                EI
4930 2622 6000           DATA  >6000            IL
4940 2624 07FF           DATA  >7FF             OL
4950 2626 0000           DATA  0                OUT
4960 2628 0000           DATA  0                ERR
4970 262A 0004           DATA  4                ERRL
4980 262C 8000           DATA  >8000            FILT
4990 262E 0000           DATA  0           GD
```

```
5000 2630 0400        DATA  >400              RLIM
5010 2632 0000        DATA  0         BIAS
5015 2634 0000        DATA  0         RATE
5016 2636 8000        DATA  >8000             EFLT
5017 2638 0000        DATA  0,0,0,0,0         ERROR TABLE
     263A 0000
     263C 0000
     263E 0000
     2640 0000
     2642 0000
5018 2644 0000        DATA  0,0,0,0,0
     2646 0000
     2648 0000
     264A 0000
     264C 0000
4406 25A8 C069        MOV   @MOD1(R9),R1
     25AA 003C
4407 25AC 0501        NEG   R1
4408 25AE CA41        MOV   R1,@MODE(R9)
     25B0 003A
4409 25B2 CA69        MOV   @MODO(R9),@OUT(R9)
     25B4 0040
     25B6 000A
4410 25B8           *
4411 25B8 C2FF PI99  MOV   *R15+,R11   RETURN
4412 25BA 045B        RT
4420 25BC           *
4430 25BC           *  LIMIT SUBROUTINE
4440 25BC           *
4450 25BC 064F LIM   DECT  R15
4460 25BE C7CB        MOV   R11,*R15
4470 25C0 C186        MOV   R6,R6       + OR -
4480 25C2 1104        JLT   LIM5
4490 25C4 8146        C     R6,R5
4500 25C6 1106        JLT   LIM8
4510 25C8 C185        MOV   R5,R6       LIMIT
4520 25CA 1004        JMP   LIM8
4530 25CC 0505 LIM5  NEG   R5          - VALUE
4540 25CE 8146        C     R6,R5
4550 25D0 1501        JGT   LIM8
4560 25D2 C185        MOV   R5,R6       LIMIT
4570 25D4 C2FF LIM8  MOV   *R15+,R11
4580 25D6 045B        RT
4590 25D8           *
4600 25D8           *  CONTROL DEFNS
4610 25D8           *
4620      0000 GP    EQU   0        PROPORTIONAL GAIN
4630      0002 GI    EQU   2        INTEGRAL GAIN
4640      0004 EI    EQU   4        INTEGRAL(GI*E)
4650      0006 IL    EQU   6        LIMIT OF INTEGRAL GI*E
4660      0008 OL    EQU   8        LIMIT OF OUTPUT
4670      000A OUT   EQU   10       OUTPUT OF CTL LAW
4680      000C ERR   EQU   12       ERROR CTS.
4690      000E ERRL  EQU   14
4700      0010 FILT  EQU   16
4710      0012 GD    EQU   18
4720      0014 RLIM  EQU   20
4730      0016 BIAS  EQU   22
4735      0018 RATE  EQU   24       ERROR RATE
4736      001A EFLT  EQU   26       ERR FILTER MPLIER
4737      001C E10   EQU   28       ERROR HISTORY TABLE,ERR(-10)
4738      001E E9    EQU   30
4739      0020 E8    EQU   32
4740      0022 E7    EQU   34
4741      0024 E6    EQU   36
```

```
4742        0026 E5     EQU  38
4743        0028 E4     EQU  40
4744        002A E3     EQU  42
4745        002C E2     EQU  44
4746        002E E1     EQU  46
4747        0030 E0     EQU  48
4748        0032 CLO    EQU  50
4749        0034 CHI    EQU  52
4750        0036 OTLO   EQU  54
4751        0038 OTHI   EQU  56
4752        003A MODE   EQU  58
4753        003C MOD1   EQU  60
4754        003E MOD2   EQU  62
```

APPENDIX II

RAM VARIABLE LIST

| ADDRESS | VARIABLE | COMMENT |
|---|---|---|
| 1126 | FLAG | |
| 1128 | TEMP GP | |
| 112A | GI | |
| 112C | EI | |
| 112E | IL | |
| 1130 | OL | |
| 1132 | OUT | |
| 1134 | ERR | |
| 1136 | ERRL | |
| 1138 | FILT | |
| 113A | GD | |
| 113C | RLIM | |
| 113E | BIAS | |
| 1140 | RATE | |
| 1142 | EFLT | |
| 1144 | E10 | |
| 1146 | E9 | |
| 1148 | E8 | |
| 114A | E7 | |
| 114C | E6 | |
| 114E | E5 | |
| 1150 | E4 | |
| 1152 | TEMP E3 | |
| 1154 | E2 | |
| 1156 | E1 | |
| 1158 | E0 | |
| 115A | CLO | |
| 115C | CHI | |
| 115E | OTHI | |

RAM VARIABLE LIST (CONTINUED)

| ADDRESS | VARIABLE | COMMENT |
|---|---|---|
| 1160 | OTLO | |
| 1162 | MODE | |
| 1164 | MOD1 | |
| 1166 | MOD2 | |
| 1168 | MOD0 | |
| 116A | VAPOR GP | |
| 116C | GI | |
| 116E | EI | |
| 1170 | IL | |
| 1172 | OL | |
| 1174 | OUT | |
| 1176 | ERR | |
| 1178 | ERRL | |
| 117A | FILT | |
| 117C | GD | |
| 117E | RLIM | |
| 1180 | VAPOR BIAS | |
| 1182 | RATE | |
| 1184 | EFLT | |
| 1186 | E10 | |
| 1188 | E9 | |
| 118A | E8 | |
| 118C | E7 | |
| 118E | E6 | |
| 1190 | E5 | |
| 1192 | E4 | |
| 1194 | E3 | |
| 1196 | E2 | |
| 1198 | E1 | |
| 119A | E0 | |
| 119C | CLO | |
| 119E | CHI | |
| 11E0 | LIQUID CHI | |
| 11E2 | OTHI | |
| 11E4 | OTLO | |
| 11E6 | MODE | |
| 11E8 | MOD1 | |
| 11EA | MOD2 | |
| 11EC | MOD0 | |

RAM VARIABLE LIST (CONTINUED)

| ADDRESS | VARIABLE | | COMMENT |
|---|---|---|---|
| 11EE | ADCT 0 | | A/D SUMS |
| 11F0 | 1 | | |
| 11F2 | 2 | | |
| 11F4 | 3 | | |
| 11F6 | 4 | | |
| 11F8 | 5 | | |
| 11FA | 6 | | |
| 11FC | 7 | | |
| 11FE | DPCC | | |
| 1200 | HRS | | |
| 1202 | MIN | | |
| 1204 | SEC | | |
| 1206 | TCNT | | |
| 1208 | PCNT | | |
| 120A | FCNT | | |
| 120C | CKNT | | |
| 120E | LCNT | | |
| 1210 | QCNT | | |
| 1212 | TICS | | |
| 11A0 | | OTHI | |
| 11A2 | | OTLO | |
| 11A4 | | MODE | |
| 11A6 | | MOD1 | |
| 11A8 | | MOD2 | |
| 11AA | | MOD0 | |
| 11AC | LIQUID | GP | |
| 11AE | | GI | |
| 11B0 | LIQUID | EI | |
| 11B2 | | IL | |
| 11B4 | | OL | |
| 11B6 | | OUT | |
| 11B8 | | ERR | |
| 11BA | | ERRL | |
| 11BC | | FILT | |
| 11BE | | GD | |
| 11C0 | | RLIM | |
| 11C2 | | BIAS | |
| 11C4 | | RATE | |
| 11C6 | | EPLT | |

RAM VARIABLE LIST (CONTINUED)

| ADDRESS | VARIABLE | COMMENT |
|---|---|---|
| 11C8 | E10 | |
| 11CA | E9 | |
| 11CC | E8 | |
| 11CE | E7 | |
| 11D0 | E6 | |
| 11D2 | E5 | |
| 11D4 | E4 | |
| 11D6 | E3 | |
| 11D8 | E2 | |
| 11DA | E1 | |
| 11DC | E0 | |
| 11DE | CLO | |

I claim:

1. A system for transferring heat from a first surface through a second surface, said second surface being characterized by substantially uniform thermal envelope, comprising:
   an inner porous layer adjacent to said first surface, said inner layer being characterized by relatively high porosity and thermal conductivity, and being adapted to house coolant,
   an outer porous layer between said inner layer and said second surface, said outer layer being characterized by a relatively low porosity and relatively high thermal conductivity, wherein said outer layer is thermally coupled to said inner layer and the pores of said outer layer are coupled to the pores of said inner layer permitting coolant flow therebetween, wherein the pores of one of said porous layers are filled with a material whereby coolant flow is prevented between inner and outer pores, said material characterized by a predetermined melting point whereby said material melts and said coolant flow is permitted when said first surface reaches a predetermined temperature,
   a vapor chamber between said second surface and an outer member,
   means for selectively controlling the vapor pressure in said vapor chamber whereby said coolant has a liquid vapor phase transition within said outer layer.

* * * * *